US008677957B2

(12) United States Patent
Goto et al.

(10) Patent No.: US 8,677,957 B2
(45) Date of Patent: Mar. 25, 2014

(54) SPARK IGNITED INTERNAL COMBUSTION ENGINE SYSTEM

(75) Inventors: Tsuyoshi Goto, Hiroshima (JP); Hidetoshi Kudou, Higashihiroshima (JP); Masami Nishida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 559 days.

(21) Appl. No.: 12/853,595

(22) Filed: Aug. 10, 2010

(65) Prior Publication Data
US 2011/0041786 A1 Feb. 24, 2011

(30) Foreign Application Priority Data
Aug. 20, 2009 (JP) .................. 2009-190880

(51) Int. Cl.
*F02D 13/02* (2006.01)
*F01L 1/34* (2006.01)

(52) U.S. Cl.
USPC ... 123/90.15; 123/316; 123/348; 123/179.18; 701/103

(58) Field of Classification Search
USPC ............... 701/103, 105, 110, 113; 123/90.17, 123/179.18, 345, 346, 347, 348, 366, 508, 123/316
See application file for complete search history.

(56) References Cited

U.S. PATENT DOCUMENTS

| 4,958,606 A * | 9/1990 | Hitomi et al. .................. 123/316 |
| 5,233,948 A * | 8/1993 | Boggs et al. ..................... 123/64 |
| 5,429,100 A * | 7/1995 | Goto et al. .................. 123/559.1 |
| 6,561,150 B1 * | 5/2003 | Kikuoka et al. ............ 123/90.18 |
| 6,626,164 B2 * | 9/2003 | Hitomi et al. .................. 123/679 |
| 2005/0087155 A1 * | 4/2005 | Kikori .......................... 123/78 C |
| 2007/0209618 A1 * | 9/2007 | Leone ......................... 123/90.12 |
| 2007/0227503 A1 * | 10/2007 | Hitomi et al. ............ 123/406.45 |
| 2008/0255752 A1 * | 10/2008 | Sugihara ....................... 701/103 |
| 2009/0031973 A1 * | 2/2009 | Murata ....................... 123/90.16 |
| 2009/0178632 A1 * | 7/2009 | Akihisa et al. ............. 123/90.15 |
| 2009/0216427 A1 * | 8/2009 | Yamakawa et al. ........... 701/103 |
| 2009/0217906 A1 * | 9/2009 | Nishimoto et al. ........... 123/348 |
| 2010/0049420 A1 * | 2/2010 | Smith et al. ................... 701/103 |

FOREIGN PATENT DOCUMENTS

| EP | 0 269 125 A2 | 6/1988 |
| EP | 1 840 357 A2 | 10/2007 |
| EP | 2 206 906 A1 | 7/2010 |
| JP | 2007-292050 A | 11/2007 |

OTHER PUBLICATIONS

ISA European Patent Office, Search Report of EP 10 00 8346, Oct. 7, 2010, 6 pages.

* cited by examiner

*Primary Examiner* — Stephen K Cronin
*Assistant Examiner* — John Zaleskas
(74) *Attorney, Agent, or Firm* — Alleman Hall McCoy Russell & Tuttle LLP (57) ABSTRACT

There is provided, in one aspect of the present description, an internal combustion engine system. In one example, the system comprises a controller configured to control an intake valve closing timing varying mechanism to vary a closing timing of the intake valve to regulate air charged in a combustion chamber in accordance with engine operating conditions and, in a first engine operating condition where a least volume of air is required to be charged into the combustion chamber, retard a closing timing of the intake valve to a most retarded crank angle which is after bottom dead center during a cylinder cycle and satisfies the following formulas:

$$\alpha \geq -0.2685 \times \epsilon 0^2 + 10.723 \times \epsilon 0 + 15.815 \text{ and}$$

$$\epsilon 0 \geq 11.0,$$

where $\alpha$ is the most retarded crank angle and $\epsilon 0$ is a geometric compression ratio of the engine.

10 Claims, 9 Drawing Sheets

SPARK IGNITED INTERNAL COMBUSTION ENGINE SYSTEM

BACKGROUND

The present description relates to a spark ignited internal combustion engine, and more particularly to one having a relatively high geometric compression ratio.

When a geometric compression ratio of an internal compression ratio is increased, its expansion ratio is increased as well. The greater expansion ratio can convert heat which the combustion of air fuel mixture has generated more effectively into a downward movement of the piston. Therefore, engines with greater compression ratios operate more efficiently. On the other hand, the greater geometric compression ratio may excessively increase a temperature in the cylinder around a compression top dead center. Under the high temperatures in the cylinder, fuel residing away from the spark plug may ignite by itself before it is reached by the flame. Under the excessively high temperatures, the fuel in the cylinder may ignite by itself even before the spark ignition. Such phenomena are commonly known as knocking and pre-ignition.

One way to avoid such abnormal combustion as knocking and pre-ignition is reducing volume of air charged in a cylinder. It is known, and for example described in U.S. Pat. No. 6,626,164, an intake valve is controlled to close later after bottom dead center of the intake stroke during a cylinder cycle to reduce the air volume charged in the cylinder in order to avoid abnormal combustion.

The prior method can reduce the cylinder air charge without reducing engine operating efficiency. Specifically, it does not need to throttle the air flowing through the intake passage to reduce the cylinder air charge. Therefore, a pressure in the intake passage, and eventually a pressure in the cylinder during an intake stroke can be maintained. As a result, a pressure working on the upper side of the piston when it descends is greater, which means a lesser pumping loss and a greater engine operating efficiency.

Such abnormal combustion caused by a higher temperature in the cylinder is more likely to occur when the engine speed is lower, the engine temperature is higher, the intake air temperature is higher, or the intake air humidity is lower. Therefore, it is preferable, in such operating conditions, to close the intake valve later after the bottom dead center during a cylinder cycle. On the other hand, in engine operating conditions such as when the engine speed is higher, the engine temperature is lower, or the intake temperature is lower, such abnormal combustion is less likely to occur. Therefore, under these operating conditions, it is preferable to charge more air into a cylinder to increase output torque from the engine, and to close the intake valve around bottom dead center. As a result, in order to secure sufficient power output from an engine with a greater compression ratio while avoiding abnormal combustion, it is necessary to broadly vary the closing timing of the intake valve.

It is necessary to broaden the varying range of the intake valve closing timing if the geometric compression ratio is very high for the reasons described above. However, it has not been known how much range is enough, and it has been usually thought that an excessively broad range is necessary. Such an excessively broad varying range of the intake valve closing timing is not acceptable because the closing timing may not vary quick enough to respond to a change of the cylinder air charge demand.

Currently, having considered the above setbacks, spark ignited internal combustion engines commercially available are not designed to have greater compression ratios and greater operating efficiency derived from the greater expansion ratios.

Therefore, there is room to improve an operating efficiency of a spark ignited internal combustion engine without causing abnormal combustion.

SUMMARY

The inventors herein have rigorously studied and unexpectedly found a setting of a geometric compression ratio and a closing timing of the intake valve of a spark ignited internal combustion engine which solves disadvantages of the prior engines and presents further advantages.

Accordingly, there is provided, in one aspect of the present description, an internal combustion engine system comprising a spark ignited internal combustion engine having a cylinder, a piston which reciprocates in the cylinder, a cylinder head which is arranged over the cylinder and forms a combustion chamber together with the cylinder and an upper surface of the piston, and an intake valve capable of shutting off air flowing into the combustion chamber. The system further comprises a fuel injector which directly injects fuel into the combustion chamber, a spark plug which is arranged on the cylinder head and makes a spark in the combustion chamber, an intake valve closing timing varying mechanism which varies a closing timing during a cylinder cycle of the intake valve, and a controller. The controller is configured to control the intake valve closing timing varying mechanism to vary a closing timing of the intake valve to regulate air charged in the combustion chamber in accordance with engine operating conditions, and in a first engine operating condition where a least volume of air is required to be charged into the combustion chamber, to retard a closing timing of the intake valve to a most retarded crank angle which is after bottom dead center during a cylinder cycle and satisfies the following formulas:

$$\alpha \geq 0.2685 \times \epsilon 0^2 + 10.723 \times \epsilon 0 + 15.815 \quad (1); \text{ and}$$

$$\epsilon 0 \geq 11.0 \quad (2)$$

where:
α is the most retarded crank angle which is expressed by a crank angle in degrees of deviation of the most retarded crank angle from the closest bottom dead center; and
ε0 is the geometric compression ratio of the engine.

According to the first aspect, by retarding the closing timing of the intake valve to the most retarded crank angle α which satisfies the above formula (1), an effective compression ratio can be lowered to 6.1 or smaller when a least volume of air is required to be charged into the combustion chamber. The inventors herein have found that an effective compression ratio of an engine needs to be 6.1 or smaller to start the engine with a fuel having a research octane number of 88 (88 RON) without causing abnormal combustion under the harshest conditions such as low engine speed, high intake air temperature, high engine temperature, and low humidity conditions which are most likely to cause abnormal combustion typically in an engine restart soon after the engine stop. Therefore, the engine can be started with the 88 RON fuel without causing abnormal combustion even under the harshest conditions.

For the engine intended for use with an 88 RON fuel, there is no need to further retard the intake valve closing timing beyond the most retarded crank angle α which satisfies the formula (1) in order to start the engine without causing abnormal combustion. When more air is required to be charged into the cylinder, the intake valve closing timing is advanced. Therefore, the varying range of the intake valve closing timing does not need to be excessively broadened, and the geometric compression ratio can be greater.

As a result, in the first aspect, the geometric compression ratio is 11 or greater and the engine operating efficiency is improved without causing abnormal combustion for spark ignited internal combustion engines intended for use with an 88 RON fuel.

There is provided, in a second aspect of the present description, an internal combustion engine system comprising the same elements as in the first aspect. The controller is configured in the same manner as in the first aspect. The most retarded crank angle α satisfies the following formulas:

$$\alpha \geq -0.5343 \times \epsilon 0^2 + 20.969 \times \epsilon 0 - 106.18 \quad (3); \text{and}$$

$$\epsilon 0 \geq 14.0 \quad (4).$$

According to the second aspect, by retarding the closing timing of the intake valve to the most retarded crank angle α which satisfies the above formula (3), an effective compression ratio can be lowered to 9.9 or smaller when a least volume of air is required to be charged into the combustion chamber. The inventors herein have found that an effective compression ratio of an engine needs to be 9.9 or smaller to start the engine with a 95 RON without causing abnormal combustion under the harshest conditions. Therefore, the engine can be started with the 95 RON fuel without causing abnormal combustion even under the harshest conditions.

For the engine intended for use with a 95 RON fuel, there is no need to further retard the intake valve closing timing beyond the most retarded crank angle calculated by the formula (3) in order to start the engine without causing abnormal combustion. When more air is required to be charged into the cylinder, the intake valve closing timing is advanced. Therefore, the varying range of the intake valve closing timing does not need to be excessively broadened, and the geometric compression ratio can be greater.

As a result, in the second aspect, the geometric compression ratio is 14 or greater and the engine operating efficiency is improved without causing abnormal combustion for spark ignited internal combustion engines intended for use with a 95 RON fuel.

In embodiments, the controller is further configured to control the intake valve closing timing varying mechanism to advance a closing timing of the intake valve to 45 degrees or less of crank angle after bottom dead center during a cylinder cycle in a second engine operating condition where a greatest volume of air is required to be charged into the combustion chamber. It enables a greater volume of air to be charged into the cylinder. When the engine speed is higher, the cylinder is fully charged with air. By using the fully charged air for the combustion in higher engine speed conditions, the output power from the engine can be maximized.

There is provided, in a third aspect of the present description, an internal combustion engine system comprising the same elements as in the first aspect. The controller is configured to control the intake valve closing timing varying mechanism to vary a closing timing of the intake valve to regulate air charged in the combustion chamber in accordance with engine operating conditions, and in a first engine operating condition where a least volume of air is required to be charged into the combustion chamber, to retard a closing timing of the intake valve to a most retarded crank angle α which is after bottom dead center during a cylinder cycle and satisfies the following formulas:

$$\alpha \geq -0.3591 \times \alpha 0^2 + 14.292 \times \epsilon 0 - 29.28 \quad (5); \text{and}$$

$$\epsilon 0 \geq 12.0 \quad (6)$$

where ε0 is the geometric compression ratio of the engine, and in a second engine operating condition where a greatest volume of air is required to be charged into the combustion chamber, advance a closing timing of said intake valve to 45 degrees or less of crank angle after bottom dead center during a cylinder cycle.

According to the third aspect, by retarding the closing timing of the intake valve to the most retarded crank angle α which satisfies the above formula (5), an effective compression ratio can be lowered to 7.7 or smaller when a least volume of air is required to be charged into the combustion chamber. The inventors herein have found that an effective compression ratio of an engine needs to be 7.7 or smaller to start the engine with a 91 RON fuel without causing abnormal combustion under the harshest conditions. Therefore, the engine can be started with the 91 RON fuel without causing abnormal combustion even under the harshest conditions.

For the engine intended for use with a 91 RON fuel, there is no need to further retard the intake valve closing timing beyond the most retarded crank angle calculated by the formula (5) in order to start the engine without causing abnormal combustion. When more air is required to be charged into the cylinder, the intake valve closing timing is advanced. Therefore, the varying range of the intake valve closing timing does not need to be excessively broadened, and the geometric compression ratio can be greater.

On the other hand, when a greatest volume of air is required to be charged into the combustion chamber, by advancing the intake valve closing timing to 45 degrees or less after the bottom dead center during a cylinder cycle, a greater volume of air can be charged into the cylinder. When the engine speed is higher, the cylinder is fully charged with air. By using the fully charged air for the combustion in higher engine speed conditions, the output power from the engine can be maximized.

As a result, in the third aspect, the geometric compression ratio is 12 or greater and the engine operating efficiency is improved without causing abnormal combustion for spark ignited internal combustion engines intended for use with 91 RON fuel while the output power from the engine can be maximized.

In the embodiments, the controller is further configured to control the intake valve closing timing varying mechanism to retard a closing timing of the intake valve as a temperature of air in the combustion chamber is higher in an engine start. Accordingly, when the air temperature in the combustion chamber is higher and abnormal combustion is more likely to occur, a volume of air in the combustion chamber can be reduced and the effective compression ratio can be reduced to suppress the occurrence of abnormal combustion. On the other hand, when the temperature is lower and abnormal combustion is less likely but the friction is higher, a greater volume of air can be charged in the combustion chamber and more torque can be generated to certainly start the engine.

Further, in the embodiments, the intake valve closing timing varying mechanism is driven by an electric motor. Accordingly, the mechanism can be actuated before the engine speed reaches a certain speed where a crankshaft driven oil pump generates sufficient pressure for a hydraulic motor. Therefore, in an engine start in a hot condition where the intake valve closing timing needs to be retarded, combustion can be started earlier without resulting in abnormal combustion.

Still further, in the embodiments, the valve closing timing varying mechanism further comprises an intake camshaft which is driven by a crankshaft that is coupled to the piston and actuates the intake valve and a phase varying mechanism which varies a relative phase of the intake camshaft to the crankshaft. The engine further comprises an exhaust passage through which exhaust gas flows from the combustion chamber, an exhaust valve capable of shutting off the exhaust gas flowing from the combustion chamber, and an exhaust camshaft which is driven by the crankshaft and actuates the exhaust valve. The system further comprises a fuel pump which supplies fuel to the fuel injector and is coupled to and driven by the exhaust camshaft. Accordingly, the fuel pump can be steadily driven by the exhaust camshaft rotational phase of which varies less than the intake camshaft does while the closing timing of intake valve is broadly varied.

DESCRIPTION OF EMBODIMENT

Hereinafter, a desirable embodiment according to the invention is described referring to the appended drawings.

Figure 1:
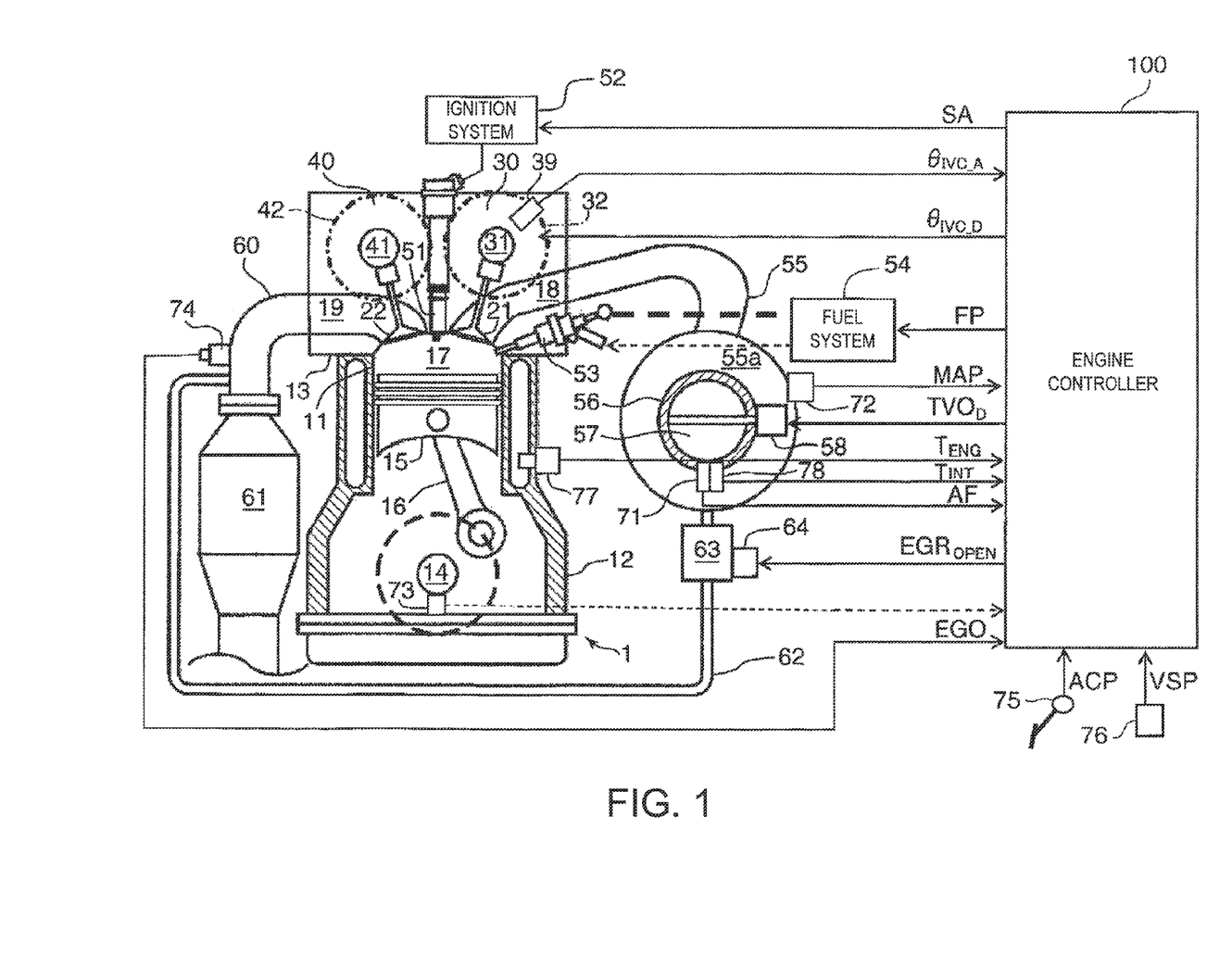
FIG. 1 is a schematic diagram of the entire structure of a control system of a spark ignited internal combustion engine according to an embodiment of the invention.

FIG. 1 schematically shows the entire structure of an engine system (a control system of a spark ignited internal combustion engine) of this embodiment. The engine system includes an engine body 1 (the spark ignited internal combustion engine), and an engine controller 100 (controller) for controlling various actuators associated with the engine body 1.

The engine body 1 is a four cycle, spark ignited internal combustion engine mounted on a vehicle, such as an automobile, of which an output shaft is coupled to drive wheels via a transmission to propel the vehicle. The engine body 1 includes a cylinder block 12 and a cylinder head 13 placed above the cylinder block 12. Two or more cylinders 11 are formed in the cylinder block 12 and the cylinder head 13. Although the number of the cylinders 11 is not limited in particular, four cylinders 11 are formed in this embodiment, for example. A crankshaft 14 is rotatably supported by the cylinder block 12 with journals, bearings, etc.

Into each of the cylinders 11, a piston 15 is fittedly inserted so as to be slidable, and a combustion chamber 17 is formed between the piston 15 and the cylinder head 13, above each piston 15. Each piston 15 is connected to a crankshaft 14 of by a respective connecting rod 16.

Here, in this embodiment, a geometric compression ratio ε0 of the engine body 1 is set to 11 or greater to raise an engine thermal efficiency and improve fuel consumption. The geometric compression ratio ε0, as been well known, is a ratio between a volume of the combustion chamber 17 when the piston 15 is located at top dead center (TDC) and a volume of the combustion chamber 17 when the piston 15 is located at bottom dead center (BDC). The ratio can be expressed by (V0+V1)/V1, where the volume of the combustion chamber 17 when the piston 15 is located at the top dead center is V1, and a cylinder displacement (stroke volume) is V0.

Two intake ports 18 and two exhaust ports 19 which communicate with each combustion chamber 17 are formed in the cylinder head 13. Two intake valves 21 for blocking respective intake ports 18 from the combustion chamber 17 and two exhaust valves 22 for blocking respective exhaust ports 19 from the combustion chamber 17 are formed in the cylinder head 13. The intake valve 21 is driven by an intake valve operating mechanism 30 (intake valve closing timing varying mechanism) described later to open and close each intake port 18 at predetermined timings. On the other hand, the exhaust valve 22 is driven by an exhaust valve operating mechanism 40 described later to open and close each exhaust port 19.

The intake valve operating mechanism 30 and the exhaust valve operating mechanism 40 have an intake camshaft 31 and an exhaust camshaft 41, respectively. The intake camshaft 31 and the exhaust camshaft 41 are coupled to the crankshaft 14 via a power transmission mechanism, such as a well-known chain-sprocket mechanism. The power transmission mechanism is typically configured so that the camshafts 31 and 41 revolve one turn while the crankshaft 14 revolves two turns.

The intake valve operating mechanism 30 is provided with an intake camshaft phase varying mechanism 32 (phase varying mechanism) between the power transmission mechanism and the intake camshaft 31.

The intake camshaft phase varying mechanism 32 makes open-and-closing timings of the intake valve 21 variable by changing a rotation phase of the intake camshaft 31 with respect to the crankshaft 14, and causes an electric motor 151 (refer to FIG. 2) to generate a torque for the rotation phase change.

Figure 2:
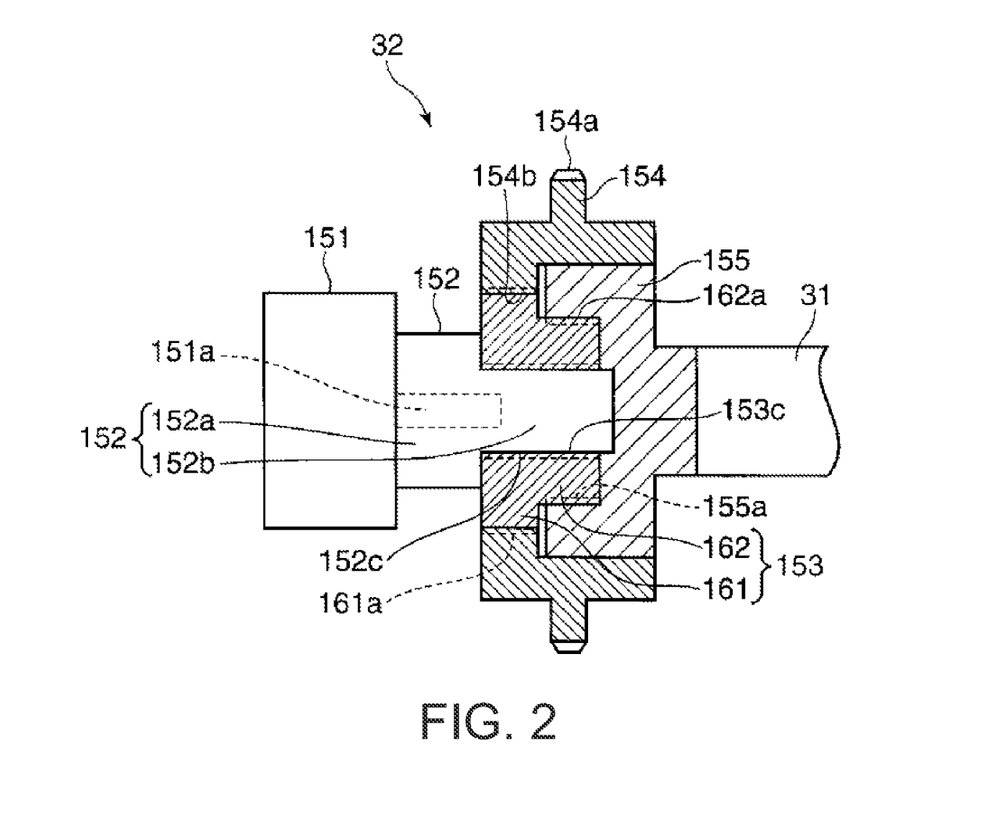
FIG. 2 is a schematic cross-sectional view of an intake camshaft phase varying mechanism.

Specifically, the intake camshaft phase varying mechanism 32 includes the electric motor 151 shown in FIG. 2, a rotor 153 coupled to an output shaft 151a of the electric motor 151 via a coupling shaft 152 so as to rotate integrally with the output shaft 151a, a sprocket body 154 coupled to the rotor 153 via gear teeth, a cam-integrally-formed gear 155 similarly coupled to the rotor 153 via gear teeth.

The electric motor 151 is disposed so that its rotation axis is in agreement with a rotation axis of the intake camshaft 31.

The cam-integrally-formed gear 155 is made from a disk-shaped member coupled to one end part of the intake camshaft 31 coaxially and integrally rotatable via a knock pin (not illustrated). A cylindrical concave portion is formed in a face of the cam-integrally-formed gear 155 opposite from the camshaft 31, and a gear portion 155a which meshes with a gear portion 162a of a rotor boss portion 162 is formed in an inner circumferential face of the cylindrical concave portion.

The sprocket body 154 is made in a cylindrical shape having a sprocket gear portion 154a formed in its peripheral face, which meshes with a chain (not illustrated), and an axial center of the sprocket body 154 is in agreement with the rotation axis of the electric motor 151 (as well as the axial center of the intake camshaft 31). A gear portion 154b which meshes with a gear portion 161a of a rotor body 161 is formed in an inner circumferential face of the sprocket body 154.

The coupling shaft 152 is made from a stepped diameter shaft coupled to the motor output shaft 151a coaxially and integrally rotatable, and includes a large diameter portion 152a and a small diameter portion 152b.

A spline teeth portion 152c which meshes with a spline recess portion 153c of the rotor 153 is formed on the peripheral face of the small diameter portion 152b of the coupling shaft 152.

The rotor 153 includes the rotor body 161 having the gear portion 161a on the peripheral face thereof and the rotor boss portion 162 having the gear portion 162a on the peripheral face thereof. The spline recess portion 153c is formed in the inner circumferential face of the rotor 153. The rotor 153 is configured so as to integrally rotate with the coupling shaft 152 by the spline coupling of the spline recess portion 153c and the spline teeth portion 152c.

The axial center of the rotor 153 (as well as the axial center of the rotor body 161 and the rotor boss portion 162) is offset by a preset distance from the rotation axis of the electric motor 151 (as well as the axial center of the output shaft 151a of the electric motor 151). Because this offset amount is small, it is not illustrated. The number of teeth of the gear portion 161a of the rotor body 161 is one tooth fewer than the number of teeth of the gear portion 154b. Similarly, the number of teeth of the gear portion 162a of the rotor boss portion 162 is one tooth fewer than the number of teeth of the gear portion 155a. With the above configuration, an eccentric planetary gear mechanism is formed between the rotor 153 (the rotor body 161 and the rotor boss portion 162), and the sprocket body 154 and the cam-integrally-formed gear 155.

When the electric motor 151 is rotated in the same direction as the rotating direction of the sprocket body 154 (i.e., the direction in agreement with the rotating direction of the crankshaft 14), according to the amount of rotation, the cam-integrally-formed gear 155 rotates in the same direction, and the rotation phase of the intake camshaft 31 advances with respect to the sprocket body 154 (i.e., crankshaft 14). On the other hand, when the electric motor 151 is rotated reversely of the rotating direction of the sprocket body 154 the rotation phase of the intake camshaft 31 retards with respect to the crankshaft 14 according to the amount of rotation. A phase angle of the intake camshaft 31 is detected by a cam phase sensor 39, and a detected signal $\theta_{IVC\_A}$ is transmitted to the engine controller 100.

As described later, in this engine system, the valve timing (opening and closing timings) of the intake valve 21 is set over a very wide range. On the other hand, as described above, in this embodiment, the phase of the intake camshaft 31 is changed by the electric motor 151 to change the valve timing of the intake valve 21. Therefore, the valve timing can be quickly, easily, and greatly changed.

Also in the exhaust valve operating mechanism 40, an exhaust camshaft phase varying mechanism 42 is provided between the power transmission mechanism and the exhaust camshaft 41. The exhaust camshaft phase varying mechanism 42 changes the valve timing of the exhaust valve 22. The exhaust camshaft phase varying mechanism 42 changes a phase difference between a driven shaft coaxially arranged with the exhaust camshaft 41 and directly driven by the crankshaft 14, and the exhaust camshaft 41, to change a phase difference between the crankshaft 14 and the exhaust camshaft 41, thereby making the opening and closing timings of the exhaust valve 22 variable.

The exhaust camshaft phase varying mechanism 42 may be an electromagnetic mechanism, which may have two or more liquid chambers arranged in a line along the circumferential direction between the driven shaft and the intake camshaft 31, for example. The mechanism 42 may also have a hydraulic mechanism for changing the phase difference by providing a pressure difference between these liquid chambers, and an electromagnet provided between the driven shaft and the exhaust camshaft 41. In this case, the mechanism 42 changes the phase difference by giving electric power to the electromagnet. The exhaust camshaft phase varying mechanism 42 is operated and controlled in response to a control signal from the engine controller 100.

Figure 3:
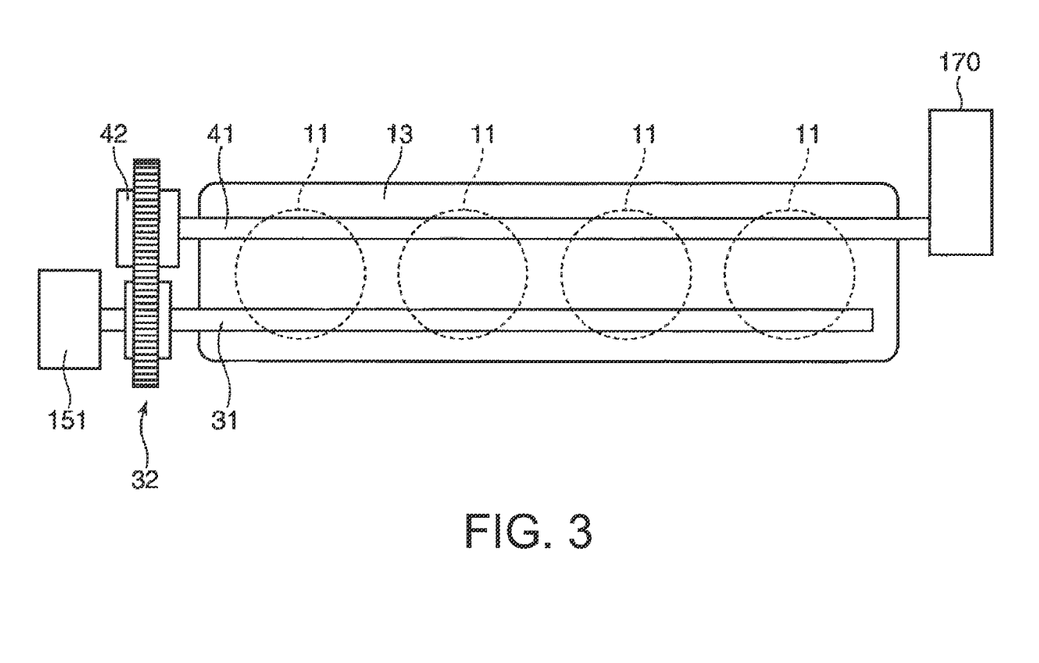
FIG. 3 is a view for illustrating coupling of a high-pressure fuel pump and an exhaust camshaft.

A high-pressure fuel pump 170 (refer to FIG. 3) for supplying fuel to a fuel injection valve 53 described later is coupled to the exhaust camshaft 41. The high-pressure fuel pump 170 pressurizes the fuel by a reciprocating plunger to supply the fuel to the injector, and the plunger is driven by the rotation of the exhaust camshaft. In this embodiment, a variable range of the valve timing of the exhaust valve 22 is set smaller compared with the valve timing of the intake valve 21. For this reason, the high-pressure fuel pump 170 can be driven stably by making the phase change amount of the exhaust camshaft smaller than that of the intake camshaft 31, and coupling the high-pressure fuel pump 170 on the side of the exhaust camshaft 41.

The intake port 18 communicates with a surge tank 55a via an intake manifold 55. A throttle body 56 is provided in an intake passage upstream of the surge tank 55a. Inside of the throttle body 56, a throttle valve 57 for adjusting a flow rate of the intake air toward the surge tank 55a from the outside is provided rotatably. The throttle valve 57 is driven by a throttle actuator 58 to change a channel area of the intake passage, thereby changing the intake air flow rate. The throttle actuator 58 drives the throttle valve 57 so that an opening of the throttle valve 57 becomes a throttle opening TVO calculated by the engine controller 100 described later.

The exhaust port 19 communicates with an exhaust pipe via an exhaust manifold 60. An exhaust gas emission control system is arranged in the exhaust pipe. Although a specific configuration of the exhaust gas emission control system is not limited as described above, it may be configured to have a catalytic converters 61, such as a three-way catalyst, a lean NOx catalyst, and/or an oxidation catalyst, for example.

The intake manifold 55 and the exhaust manifold 60 communicate with each other via an EGR pipe 62, and they are configured such that a part of the exhaust gas circulates to the intake side. In the EGR pipe 62, an EGR valve 63 that is driven by an EGR valve actuator 64 to adjust a flow rate of EGR gas circulating to the intake side through the EGR pipe 62 is provided. The EGR valve actuator 64 drives the EGR valve 63 so that an opening of the EGR valve 63 becomes an EGR opening $EGR_{open}$ calculated by the engine controller 100 (described later) to adjust the flow rate of the EGR gas to a suitable value.

Spark plugs 51 are attached to the cylinder head 13 so that their tip ends face the respective combustion chambers 17. When the spark plugs 51 are supplied by an ignition system 52 with electric power based on ignition timings SA calculated by the engine controller 100 described later, they generate sparks in the respective combustion chambers 17.

The fuel injection valves 53 for directly injecting the fuel into the respective combustion chambers 17 are attached to the cylinder head 13 so that their tip ends face the respective combustion chambers 17. In more detail, each fuel injection valve 53 is arranged so that the tip end thereof is located below the two intake ports 18 in the vertical direction and is located at an intermediate position between the two intake ports 18 in the horizontal direction. The fuel injection valve 53 injects a given amount of the fuel into the combustion chamber 17 by a solenoid which is provided in the valve being supplied by a fuel system 54 with electric power for a preset period of time based on a fuel injection amount FP calculated by the engine controller 100 described later.

The engine controller 100 is a controller typically based on a well-known microcomputer, and typically includes a CPU for executing a program or programs, a memory including a RAM and/or ROM for storing the program(s) and various data, and an I/O bus for inputting and outputting various signals.

The engine controller 100 is inputted via the I/O bus with various kinds of information, such as a temperature (engine temperature) $T_{ENG}$ of an engine cooling water detected by a water temperature sensor 77, a temperature $T_{INT}$ of the intake air upstream of the throttle valve 57 detected by an intake air temperature sensor 78, an intake air amount AF detected by an air flow meter 71, an air pressure MAP inside the intake manifold 55 detected by an intake air pressure sensor 72, a crank angle pulse signal detected by a crank angle sensor 73, an oxygen concentration EGO of the exhaust gas detected by an oxygen concentration sensor 74, a depression amount ACP of an accelerator pedal by a driver of the automobile detected by an accelerator pedal position sensor 75, and a vehicle speed VSP detected by a vehicle speed sensor 76.

The engine controller 100, based on the inputs described above, calculates instruction values for various actuators so that an air charge amount, the ignition timing and the like in the cylinder 11 become suitable values according to an operating condition. For example, the instruction values of the throttle opening TVO, the fuel injection amount FP, the ignition timing SA, the EGR opening $EGR_{open}$, the valve timings of the intake valve 21 and the exhaust valve 22 are calculated, and the instruction values are outputted to the fuel system 54, the ignition system 52, the EGR valve actuator 64, the throttle actuator 58, and the electric motor 151 of the intake camshaft phase varying mechanism 32, the exhaust camshaft phase varying mechanism 42 and the like, respectively.

Figure 4:
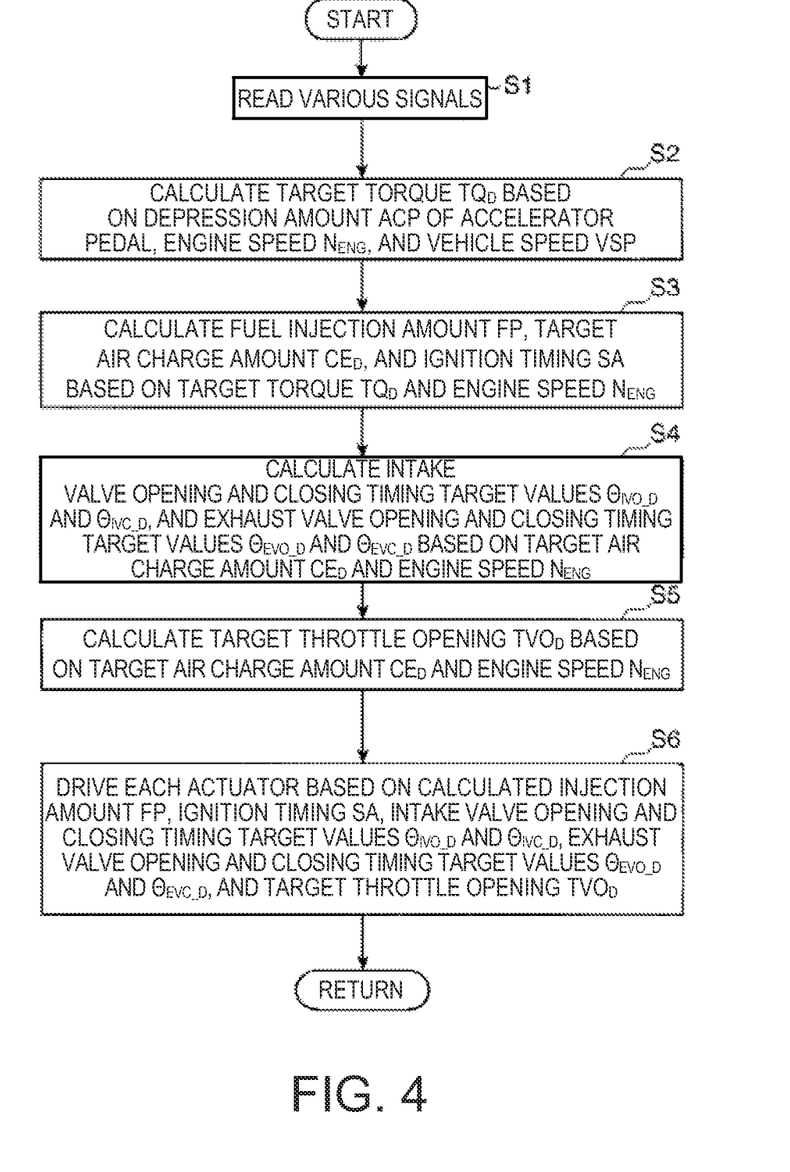
FIG. 4 is a flowchart for illustrating a control procedure of various actuators by an engine controller.

A specific calculation procedure by the engine controller 100 is described referring to a flowchart of FIG. 4.

First, the various signals, such as the depression amount ACP of the accelerator pedal, are read (Step S1).

Next, a target torque $TQ_D$ is calculated based on the depression amount ACP of the accelerator pedal, as well as a rotation speed of the engine body 1 (engine speed $N_{ENG}$) and a vehicle speed VSP calculated based on the crank angle pulse signal (Step S2).

Next, based on the target torque $TQ_D$ and the engine speed $N_{ENG}$ calculated at Step S2, the fuel injection amount FP, a target air charge amount $CE_D$ (a target value of the air charge amount CE in the cylinder 11), and the ignition timing SA are calculated (Step S3).

Then, based on the target air charge amount $CE_D$ calculated at Step S3 and the engine speed $N_{ENG}$, the valve timings of the intake valve 21 (i.e., an opening timing $\theta_{IVO\_D}$ and a closing timing $\theta_{IVC\_D}$ of the intake valve 21) are calculated. Here, in this embodiment, a valve opening period of the intake valve 21 is kept constant, and the opening timing $\theta_{IVO\_D}$ of the intake valve 21 is also calculated associated with the calculation of the closing timing $\theta_{IVC\_D}$ of the intake valve 21. In addition, based on the target air charge amount $CE_D$ and the engine speed $N_{ENG}$, the valve timings of the exhaust valve 22 (i.e., an opening timing $\theta_{EVO\_D}$ and a closing timing $\theta_{EVC\_D}$ of the exhaust valve 22) are calculated (Step S4).

The details of the calculation method of the closing timing $\theta_{IVC\_D}$ of the intake valve 21 are described later.

Further, based on the target air charge amount $CE_D$ and the engine speed $N_{ENG}$, the instruction value $TVO_D$ of the opening of the throttle valve 57 is calculated (Step S5).

Then, based on the calculated fuel injection amount FP, ignition timing SA, opening timing $\theta_{IVO\_D}$ of the intake valve 21, closing timing $\theta_{IVC\_D}$ of the intake valve 21, opening timing $\theta_{EVO\_D}$ of the exhaust valve 22, closing timing $\theta_{EVC\_D}$ of the exhaust valve 22, and throttle opening $TVO_D$, each actuator is driven so that these instruction values are satisfied (Step S6).

Specifically, the signals $\theta_{IVO\_D}$ and $\theta_{IVC\_D}$ are outputted to the intake camshaft phase varying mechanism 32 (and the electric motor 151). Then, the intake camshaft phase varying mechanism 32 operates so that the phase of the intake camshaft 31 with respect to the crankshaft 14 becomes a value corresponding to $\theta_{IVO\_D}$ and $\theta_{IVC\_D}$.

The signals $\theta_{EVO\_D}$ and $\theta_{EVC\_D}$ are outputted to the exhaust camshaft phase varying mechanism 42. Then, the exhaust camshaft phase varying mechanism 42 operates so that the phase of the exhaust camshaft 41 with respect to the crankshaft 14 becomes a value corresponding to $\theta_{EVO\_D}$ and $\theta_{EVC\_D}$.

The signal $TVO_D$ is outputted to the throttle actuator 58. Then, the throttle actuator 58 operates so that the opening of the throttle valve 57 becomes a value corresponding to $TVO_D$.

The signal FP is outputted to the fuel system 54. An amount of the fuel that corresponds to FP per one cylinder cycle is injected from the fuel injection valve 53.

Then, the signal SA is outputted to the ignition system 52. The spark plug 51 generates sparks at a timing corresponding to SA during the cylinder cycle to ignite an air fuel mixture inside the combustion chamber 17. Thus, the air fuel mixture containing the required amounts of air and fuel is ignited and combusted at a suitable timing, thereby generating from the engine body 1 a target torque which can mainly be calculated based on the depression amount ACP of the accelerator pedal.

Figure 5:
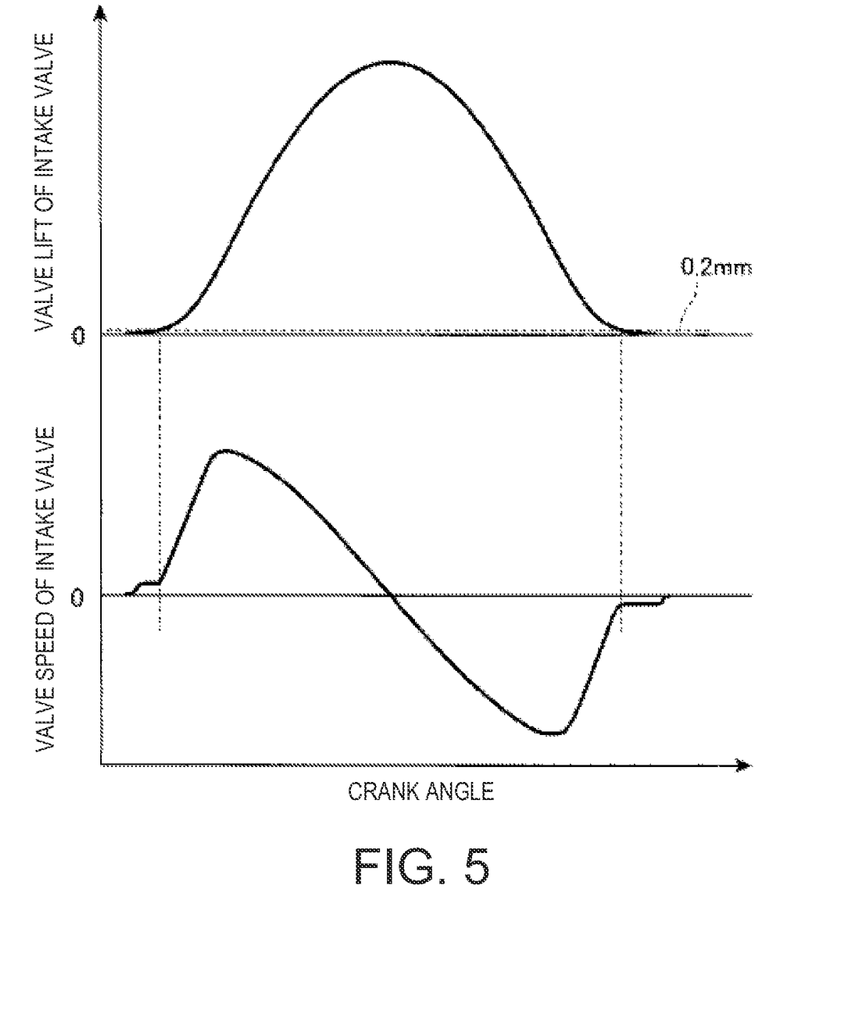
FIG. 5 is a graph showing a valve lift and a valve speed of an intake valve.

Next, a calculation method of the closing timing $\theta_{IVC\_D}$ of the intake valve 21 at Step S4 (i.e., a specific method of controlling the intake valve 21) is described. Note that a numerical value representing the closing timing of the intake valve 21 in the following description is indicated by a crank angle, and as shown in FIG. 5, this angle is such that a lift of the intake valve 21 becomes 0.2 mm and a valve speed thereof becomes slow. FIG. 5 shows the lift and the valve speed of the intake valve 21 with respect to the crank angle.

The closing timing $\theta_{IVC\_D}$ of the intake valve 21 is controlled so as to advance together with an increase of the engine speed $N_{ENG}$ between the most retarded angle (described later) which is set to the most retarded side and the most advanced angle (described later) which is set to the most advance side, on the retarded side from BDC (intake bottom dead center). The closing timing $\theta_{IVC\_D}$ of the intake valve is controlled in starting of the engine body 1 so as to retard more as a temperature inside the combustion chamber 17 calculated based on the temperature $T_{ENG}$ of the engine cooling water detected by the water temperature sensor 77 and the intake air temperature $T_{INT}$ detected by the intake air temperature sensor 78 becomes higher.

Figure 6:
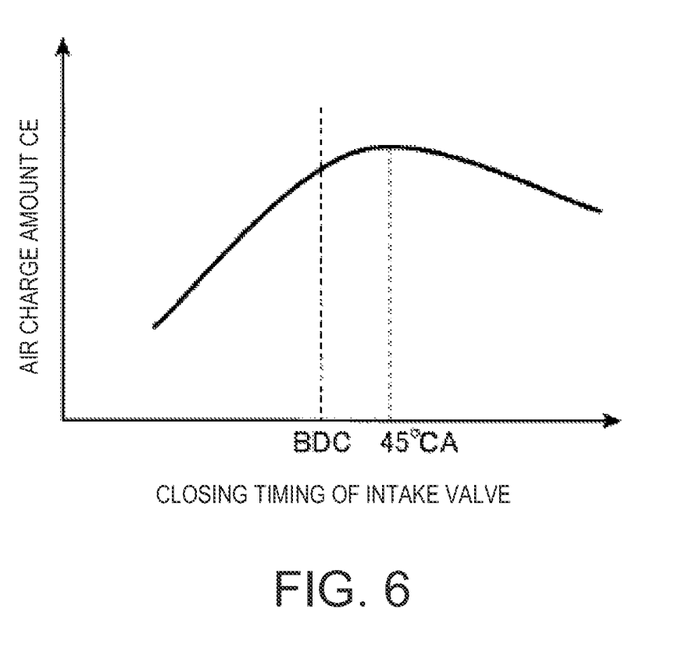
FIG. 6 is a view for illustrating a relationship between a closing timing of the intake valve and an air charge amount.

As shown in FIG. 6, the air charge amount CE in the cylinder 11 becomes the largest when the closing timing $\theta_{IVC\_D}$ of the intake valve 21 is at the retarded side from BDC. The air charge amount CE decreases as the closing timing $\theta_{IVC\_D}$ of the intake valve 21 retards more than an angle at which the air charge amount CE is the maximum, because the air in the cylinder 11 blows back to the intake passage side. Therefore, in this engine system, the closing timing $\theta_{IVC\_D}$ of the intake valve 21 is set at the retarded side from BDC as described above, and the retarded amount is changed to change the blow back amount of the air from the cylinder 11 to the intake passage side. Thereby, the air charge amount CE in the cylinder 11 is controlled to a value corresponding to the operating condition. Thus, by changing the air charge amount CE according to the change of the closing timing $\theta_{IVC\_D}$ of the intake valve 21, a pumping loss can be suppressed compared with the case where the air charge amount CE is changed by the throttle valve 57. The most retarded angle of the closing timing $\theta_{IVC\_D}$ of the intake valve 21 is set to a value such that the retarded amount α from BDC satisfies α≥−0.2685×ϵ0²+10.723×ϵ0+15.815 where the geometric compression ratio of the engine body 1 is ϵ0. That is, in FIG. 7, the retarded amount α is set above a quadratic curve L1. The setting of the most retarded angle is based on the following consideration.

Figure 7:
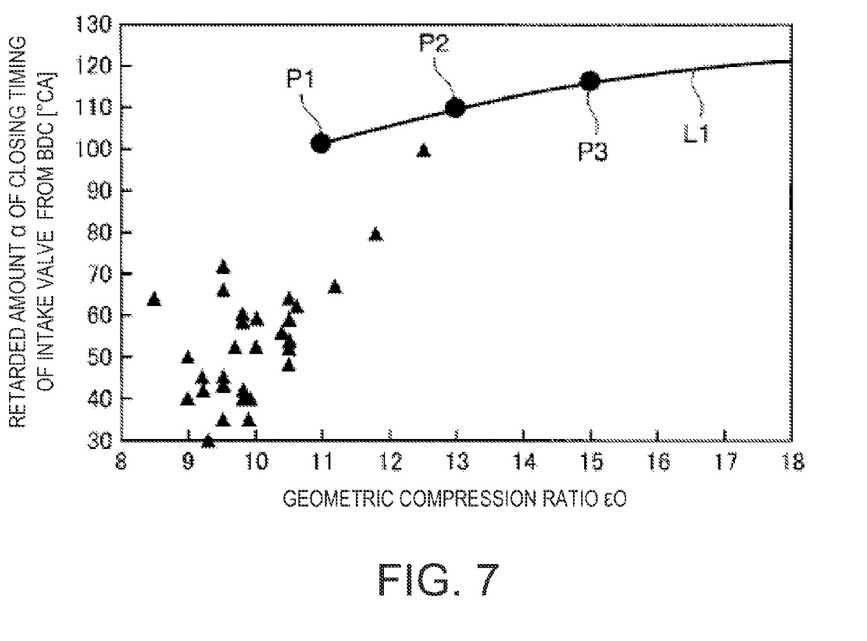
FIG. 7 is a view showing a relationship of a geometric compression ratio of a fuel of octane number 88 RON and a closing timing of the intake valve.

As described above, in this engine system, the compression ratio of the engine body 1 is set to a high compression ratio of at least 11 or greater and, thus, abnormal combustion may easily occur near the compression top dead center where the air fuel mixture is ignited, because of the increase of the temperature in the cylinder 11. Therefore, it is necessary to sufficiently make the closing timing $\theta_{IVC\_D}$ of the intake valve 21 to the retarded side to sufficiently suppress the air charge amount CE.

For this, the inventors herein variously changed the closing timing $\theta_{IVC\_D}$ of the intake valve 21 in two or more spark ignited internal combustion engines with different geometric compression ratios ϵ0, and measured a limit angle of the closing timing $\theta_{IVC\_D}$ of the intake valve 21 where the abnormal combustion occurs by experiment. Specifically, this experiment was conducted for the engines with the geometric compression ratios ϵ0 of 11, 13, and 15. The abnormal combustion occurs the most in a condition where the engine speed $N_{ENG}$ is low, the temperature of the intake air and the temperature of the engine cooling water are high, and humidity is low. Therefore, the experiment was conducted in a condition where the engine speed is 500 rpm, the temperature of the intake air inside the intake port is 70° C., and the humidity is 3 to 12 g/m³, and the engine water temperature is 105° C.

As results of the experiment conducted for the engines with the geometric compression ratios ϵ0 of 11, 13, and 15, using the fuel of 88 RON in the octane number, the following was found. In the condition where the abnormal combustion occurs the most with the temperature of the intake air inside the intake port being 100° C., the humidity being 0 g/m³, and the engine water temperature being 115° C., the abnormal combustion occurs when the retarded amount a of the closing timing $\theta_{IVC\_D}$ of the intake valve 21 from BDC is made smaller than the values shown by P1, P2, and P3 in FIG. 7 (i.e., made to the advance side). That is, it was found that angles at the points P1, P2, and P3 are limit angles for not causing the abnormal combustion. In addition, it was found that an effective compression ratio is 6.1 for every limit angle, and therefore, if the effective compression ratio can be suppressed to 6.1 or less, it is possible to avoid the abnormal combustion.

Here, if a volume of the combustion chamber 17 when the piston 15 is located at the top dead center is set to V2 and a volume of the combustion chamber 17 at the closing timing $\theta_{IVC\_D}$ of the intake valve 21 (a portion formed above the piston 15 in the cylinder 11) is set to $V_{IVC}$, the effective compression ratio ϵ can be expressed by ϵ=1+$V_{IVC}$/V2.

If a ratio "k" of a length "l" of a connecting rod and a crank radius "r" is k=l/r, the volume $V_{IVC}$ at the closing timing $\theta_{IVC\_D}$ of the intake valve 21 can be expressed as $V_{IVC}$=(k+1−√(k²−sin² $\theta_{IVC\_D}$)+cos $\theta_{IVC\_D}$)×V0/2, by using the displacement volume V0.

Here, it is known that the volume V2 of the combustion chamber 17 will be smaller than an initial volume V1 of the combustion chamber 17 used in calculating the geometric compression ratio ϵ0, associated with the operation of the engine, as a result of deposits adhering to a wall surface of the combustion chamber 17. In addition, it is known that the volume V2 of the combustion chamber 17 can be expressed by V0/V2≤ϵ0+0.4, using the geometric compression ratio ϵ0 and the displacement volume V0. Therefore, in order to certainly make the effective compression ratio ϵ be 6.1 or less, if the volume V2 of the combustion chamber 17 is set to V0/(ϵ0+0.4), the effective compression ratio ϵ at the closing timing $\theta_{IVC\_D}$ of the intake valve 21 will be ϵ=1+(k+1−√(k²−sin² $\theta_{IVC\_D}$)+cos $\theta_{IVC\_D}$)×(ϵ0+0.4)/2.

It is known that the ratio "k" of the length "l" of the connecting rod and the crank radius "r" is within a range of 3.5 to 3.9. If the value "k" is used and a part of the equation is simplified, the retarded amount a of the closing timing $\theta_{IVC\_D}$ of the intake valve 21 from BDC where the effective compression ratio is ϵ≤6.1, will be α≥−0.2685×ϵ0²+10.723×ϵ0+15.815.

As described above, the closing timing $\theta_{IVC\_D}$ of the intake valve 21 is controlled to the retarded side from the angle calculated by the quadratic function f1=−0.2685×ϵ0²+10.723×ϵ0+15.815 of the geometric compression ratio ϵ0. Therefore, the effective compression ratio ϵ can be made to be 6.1 or less, thereby raising the geometric compression ratio while avoiding the occurrence of the abnormal combustion for the fuel with the octane number of at least 88 RON or more.

Similarly, the experiment is conducted for the engines with the geometric compression ratio ϵ0 of 12, 14, and 16, using a fuel with the octane number of 91 RON. It can be found for the fuel that the occurrence of the abnormal combustion can be avoided by setting as follows: the retarded amount a of the closing timing $\theta_{IVC\_D}$ of the intake valve 21 from BDC is made smaller than the values shown by P11, P12, and P13 in FIG. 8 to set the effective compression ratio to 7.7 or less; and the retarded amount α of the closing timing $\theta_{IVC\_D}$ of the intake valve 21 from BDC is set to a value such that α≥−0.3591×ϵ0²+14.292×ϵ0−29.28 is satisfied (i.e., a value above the line L2 shown in FIG. 8). Therefore, the closing timing $\theta_{IVC\_D}$ of the intake valve 21 is controlled to the retarded side from an angle calculated by the quadratic function f2=−0.3591×ϵ0²+14.292×ϵ0−29.28 of the geometric compression ratio ϵ0, thereby, raising the geometric compression ratio while avoiding the occurrence of the abnormal combustion for the fuel with the octane number of 91 RON or more.

Figure 8:
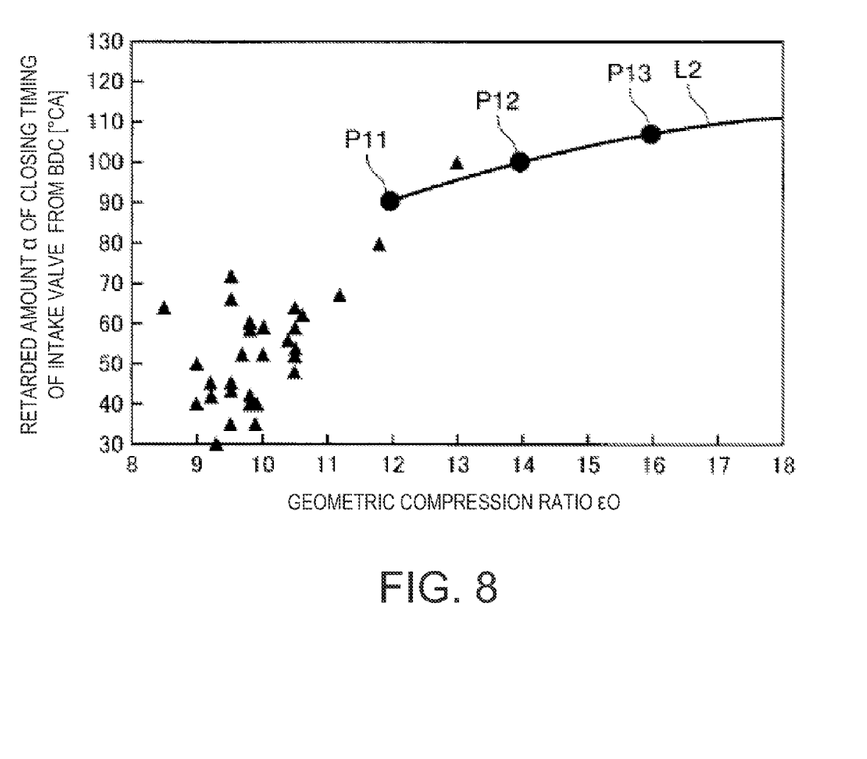
FIG. 8 is a view showing a relationship of a geometric compression ratio of a fuel of octane number 91 RON and a closing timing of the intake valve.

The fuel of 91 RON originally does not cause abnormal combustion easily. Therefore, if using the fuel of 91 RON, the range setting for the closing timing of the intake valve is effective especially when the geometric compression ratio is 12 or more.

Using the fuel with the octane number of 95 RON, the experiment is conducted for the engines with the geometric compression ratios ϵ0 of 14, 15, and 16. For these fuels, it is found that the occurrence of the abnormal combustion can be avoided by setting as follows: the retarded amount α of the closing timing $\theta_{IVC\_D}$ of the intake valve 21 from BDC is made smaller than the values shown by P21, P22, and P23 in FIG. 9 to set the effective compression ratio to 9.9 or less; and the retarded amount a of the closing timing $\theta_{IVC\_D}$ of the intake valve 21 from BDC is set to a value which satisfies α≥−0.5343×ϵ0²+20.969×ϵ0−106.18 (i.e., a value above the line L3 shown in FIG. 9). Thus, the closing timing $\theta_{IVC\_D}$ of the intake valve 21 is controlled to the retarded side from an angle calculated by the quadratic function f3=−0.5343×ϵ0²+20.969×ϵ0−106.18 of the geometric compression ratio ϵ0, thereby raising the geometric compression ratio while avoiding the occurrence of the abnormal combustion for the fuel with the octane number of 95 RON or more.

Figure 9:
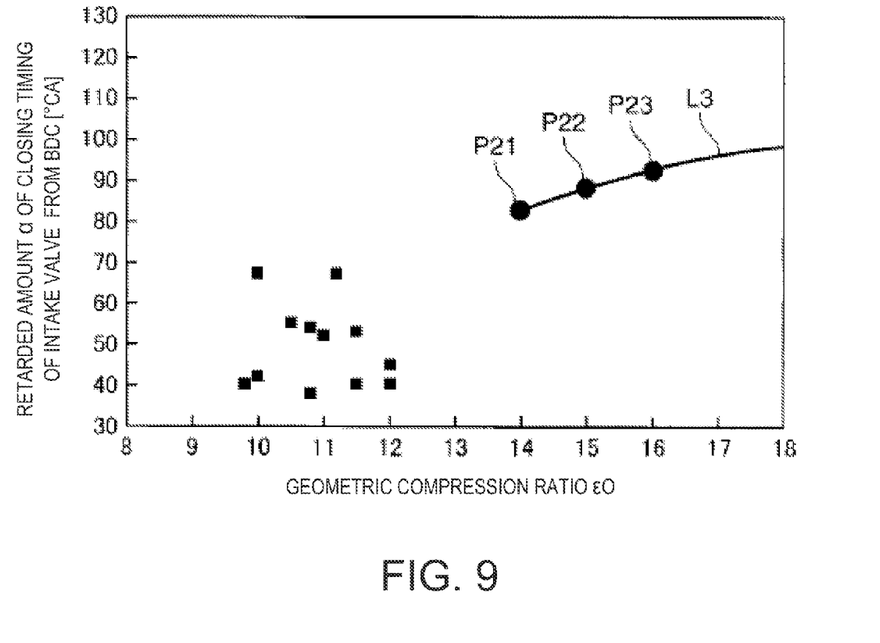
FIG. 9 is a view showing a relationship of a geometric compression ratio of a fuel of octane number 95 RON and a closing timing of the intake valve.

The fuel of 95 RON is originally more difficult to cause abnormal combustion than the fuel of 91 RON. Therefore, if using the fuel of 95 RON, the range setting of the closing timing of the intake valve is especially effective when the geometric compression ratio is 14 or more.

Two or more data points represented by triangle symbols in FIGS. 7 and 8 are the geometric compression ratio and the closing timing of the intake valve 21 in the engine of the current automobile generally used in Japan. Further, two or more data points represented by square symbols in FIG. 9 are the geometric compression ratio and the closing timing of the intake valve 21 in the engine of the automobile generally used in Europe where the fuel of 95 RON is mainly used.

Meanwhile, the most advanced angle of the closing timing $\theta_{IVC\_D}$ of the intake valve 21 is set such that the retarded amount from BDC becomes 45° CA or less.

As described above, the closing timing $\theta_{IVC\_D}$ of the intake valve 21 where the air charge amount CE is the maximum is at the retarded side from BDC. When the closing timing $\theta_{IVC\_D}$ of the intake valve 21 where this air charge amount CE is the maximum is measured for various engines, the inventors found out that it is within a range of ABDC35° CA to 45° CA. Therefore, the sufficient air charge amount CE can be secured by setting the most advanced angle of the closing timing $\theta_{IVC\_D}$ of the intake valve 21 to the advance side at least from ABDC45° CA (i.e., the retarded amount from BDC is set to 45° CA or less).

As described above, in this engine system, because the most retarded angle of the closing timing $\theta_{IVC\_D}$ of the intake valve 21 is set to the retarded side from the value calculated based on each of the functions f1, f2, and f3, the geometric compression ratio of the engine body 1 can be at a high compression ratio while the abnormal combustion is avoided. In addition, because the most advanced angle of the closing timing $\theta_{IVC\_D}$ of the intake valve 21 is set to ABDC45° CA or less, the air charge amount CE can be secured and the engine output can be increased. In addition, because the closing timing $\theta_{IVC\_D}$ of the intake valve 21 is set within the optimum as described above, the variable range of the intake valve 21 can be suppressed from being excessive.

In the above embodiment, the specific module for rotating the intake camshaft 31 to change the valve timing of the intake valve 21 is not limited to the electric motor. For example, as similar to the exhaust camshaft phase varying mechanism 32, the intake camshaft 31 may be rotated by a liquid pressure or an electromagnet where the intake camshaft phase varying mechanism 32 serves as the hydraulic mechanism, the electromagnetic mechanism, etc. However, if the electric motor is used, the valve timing of the intake valve 21 can more easily be changed over a wide range.

Further, the configuration of the spark ignited internal combustion engine is not limited to that of the above embodiment, but may include other various configurations. For example, the engine body 1 may not be the four-cylinder engine, but may be a six-cylinder engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An internal combustion engine system comprising:
    a spark ignited internal combustion engine having a cylinder, a piston which reciprocates in said cylinder, a cylinder head which is arranged over said cylinder and forms a combustion chamber together with said cylinder and an upper surface of said piston, and an intake valve capable of shutting off air flowing into said combustion chamber;
    a fuel injector which directly injects fuel into said combustion chamber;
    a spark plug which is arranged on said cylinder head and makes a spark in said combustion chamber;
    an intake valve closing timing varying mechanism which varies a closing timing during a cylinder cycle of said intake valve; and
    a controller configured to control said intake valve closing timing varying mechanism to:
        vary a closing timing of said intake valve to regulate air charged in said combustion chamber in accordance with engine operating conditions; and
        in a first engine operating condition where a least volume of air is required to be charged into said combustion chamber, retard a closing timing of said intake valve to a most retarded crank angle which is after bottom dead center during a cylinder cycle and satisfies the following formulas such that an effective compression ratio is lowered to 6.1 or smaller:

$$\alpha \geq -0.2685 \times \epsilon 0^2 + 10.723 \times \epsilon 0 + 15.815; \text{ and}$$

$$\epsilon 0 \geq 11.0$$

where:
    α is said most retarded crank angle which is expressed by a crank angle in degrees of deviation of said most retarded crank angle from a closest bottom dead center; and
    ε0 is a geometric compression ratio of said engine.

2. The system as described in claim 1, wherein said controller is further configured to control said intake valve closing timing varying mechanism to advance the closing timing of said intake valve to 45 degrees or less of crank angle after bottom dead center during a cylinder cycle in a second engine operating condition where a greatest volume of air is required to be charged into said combustion chamber.

3. The system as described in claim 2, wherein said controller is further configured to control said intake valve closing timing varying mechanism to retard the closing timing of said intake valve more as a temperature of air in said combustion chamber increases in an engine start, such that the most retarded crank angle is more retarded as the temperature of air in said combustion increases during the engine start.

4. The system as described in claim 3, wherein said intake valve closing timing varying mechanism is driven by an electric motor.

5. The system as described in claim 4, wherein said valve closing timing varying mechanism further comprises an intake camshaft which is driven by a crankshaft that is coupled to said piston and actuates said intake valve and a phase varying mechanism which varies a relative phase of said intake camshaft to said crankshaft, and
    wherein said engine further comprises an exhaust passage through which exhaust gas flows from said combustion chamber, an exhaust valve capable of shutting off the exhaust gas flowing from said combustion chamber, an exhaust camshaft which is driven by said crankshaft and actuates said exhaust valve, and the system further comprising a fuel pump which supplies fuel to said fuel injector and is coupled to and driven by said exhaust camshaft.

6. The system as described in claim 1, wherein said controller is further configured to control said intake valve closing timing varying mechanism to retard the closing timing of said intake valve more as a temperature of air in said combustion chamber increases in an engine start, such that the most retarded crank angle is more retarded as the temperature of air in said combustion increases during the engine start.

7. The system as described in claim 1, wherein said intake valve closing timing varying mechanism is driven by an electric motor.

8. The system as described in claim 1, wherein said valve closing timing varying mechanism further comprises an intake camshaft which is driven by a crankshaft that is coupled to said piston and actuates said intake valve and a phase varying mechanism which varies a relative phase of said intake camshaft to said crankshaft, and wherein said engine further comprises an exhaust passage through which exhaust gas flows from said combustion chamber, an exhaust valve capable of shutting off the exhaust gas flowing from said combustion chamber, an exhaust camshaft which is driven by said crankshaft and actuates said exhaust valve, and the system further comprising a fuel pump which supplies fuel to said fuel injector and is coupled to and driven by said exhaust camshaft.

9. An internal combustion engine system comprising:

a spark ignited internal combustion engine having a cylinder, a piston which reciprocates in said cylinder, a cylinder head which is arranged over said cylinder and forms a combustion chamber together with said cylinder and an upper surface of said piston, and an intake valve capable of shutting off air flowing into said combustion chamber;

a fuel injector which directly injects fuel into said combustion chamber;

a spark plug which is arranged on said cylinder head and makes a spark in said combustion chamber;

an intake valve closing timing varying mechanism which varies a closing timing during a cylinder cycle of said intake valve, wherein said intake valve closing timing varying mechanism is driven by an electric motor; and a controller configured to control said intake valve closing timing varying mechanism to:

vary a closing timing of said intake valve to regulate air charged in said combustion chamber in accordance with engine operating conditions;

in a first engine operating condition where a least volume of air is required to be charged into said combustion chamber, retard a closing timing of said intake valve to a most retarded crank angle which is after bottom dead center during a cylinder cycle and satisfies the following formulas such that an effective compression ratio is lowered to 7.7 or smaller:

$$\alpha \geq -0.3591 \times \epsilon 0^2 + 14.292 \times \epsilon 0 - 29.28; \text{ and}$$

$$\epsilon 0 \geq 12.0$$

where:

$\alpha$ is said most retarded crank angle which is expressed by a crank angle in degrees of deviation of said most retarded crank angle from a closest bottom dead center; and $\epsilon 0$ is a geometric compression ratio of said engine, and in a second engine operating condition where a greatest volume of air is required to be charged into said combustion chamber, advance a closing timing of said intake valve to 45 degrees or less of crank angle after bottom dead center during a cylinder cycle.

10. An internal combustion engine system comprising:

a spark ignited internal combustion engine having a cylinder, a piston which reciprocates in said cylinder, a cylinder head which is arranged over said cylinder and forms a combustion chamber together with said cylinder and an upper surface of said piston, and an intake valve capable of shutting off air flowing into said combustion chamber;

a fuel injector which directly injects fuel into said combustion chamber;

a spark plug which is arranged on said cylinder head and makes a spark in said combustion chamber;

an intake valve closing timing varying mechanism which varies a closing timing during a cylinder cycle of said intake valve, wherein said valve closing timing varying mechanism further comprises an intake camshaft which is driven by a crankshaft that is coupled to said piston and actuates said intake valve and a phase varying mechanism which varies a relative phase of said intake camshaft to said crankshaft;

an exhaust passage through which exhaust gas flows from said combustion chamber, an exhaust valve capable of shutting off the exhaust gas flowing from said combustion chamber, an exhaust camshaft which is driven by said crankshaft and actuates said exhaust valve;

a fuel pump which supplies fuel to said fuel injector and is coupled to and driven by said exhaust camshaft; and a controller configured to control said intake valve closing timing varying mechanism to:

vary a closing timing of said intake valve to regulate air charged in said combustion chamber in accordance with engine operating conditions;

in a first engine operating condition where a least volume of air is required to be charged into said combustion chamber, retard a closing timing of said intake valve to a most retarded crank angle which is after bottom dead center during a cylinder cycle and satisfies the following formulas such that an effective compression ratio is lowered to 7.7 or smaller:

$$\alpha \geq -0.3591 \times \epsilon 0^2 + 14.292 \times \epsilon 0 - 29.28; \text{ and}$$

$$\epsilon 0 \geq 12.0$$

where:

$\alpha$ is said most retarded crank angle which is expressed by a crank angle in degrees of deviation of said most retarded crank angle from a closest bottom dead center; and $\epsilon 0$ is a geometric compression ratio of said engine, and in a second engine operating condition where a greatest volume of air is required to be charged into said combustion chamber, advance a closing timing of said intake valve to 45 degrees or less of crank angle after bottom dead center during a cylinder cycle.

* * * * *